US012770795B2

(12) United States Patent
Choi et al.

(10) Patent No.: US 12,770,795 B2
(45) Date of Patent: Oct. 20, 2026

(54) MULTILAYER ELECTRONIC COMPONENT

(71) Applicant: SAMSUNG ELECTRO-MECHANICS CO., LTD., Suwon-si (KR)

(72) Inventors: Hyo Sung Choi, Suwon-si (KR); Jung Jin Park, Suwon-si (KR); Ho Sam Choi, Suwon-si (KR); Dae Jin Shim, Suwon-si (KR); Seung Yong Lee, Suwon-si (KR); Yong Hwa Lee, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 240 days.

(21) Appl. No.: 18/795,951

(22) Filed: Aug. 6, 2024

(65) Prior Publication Data

US 2025/0166922 A1 May 22, 2025

(30) Foreign Application Priority Data

Nov. 16, 2023 (KR) ........................ 10-2023-0158979

(51) Int. Cl.
*H01G 4/30* (2006.01)
*H01G 4/008* (2006.01)
(Continued)

(52) U.S. Cl.
CPC ............... *H01G 4/30* (2013.01); *H01G 4/008* (2013.01); *H01G 4/012* (2013.01); *H01G 4/1227* (2013.01); *H01G 4/224* (2013.01)

(58) Field of Classification Search
CPC .......... H01G 4/30; H01G 4/008; H01G 4/012; H01G 4/1227; H01G 4/224
See application file for complete search history.

(56) References Cited

U.S. PATENT DOCUMENTS 7,541,305 B2 * 6/2009 Ito ......................... C04B 35/638 501/138
10,872,725 B2 * 12/2020 Moon .................... H01G 4/385
(Continued)

FOREIGN PATENT DOCUMENTS

JP 2006-062937 A 3/2006
JP 2022-068525 A 5/2022
(Continued)

OTHER PUBLICATIONS

Partial European Search Report dated May 15, 2025 issued in the corresponding European Patent Application No. 24193075.9.

*Primary Examiner* — Michael P Mcfadden
(74) *Attorney, Agent, or Firm* — Morgan, Lewis & Bockius LLP

(57) ABSTRACT

A multilayer electronic component according to an example embodiment of the present disclosure may include: a body including a capacitance formation portion including a dielectric layer and internal electrodes alternately disposed with the dielectric layer in a first direction, and a cover portion disposed on both end surfaces of the capacitance formation portion in the first direction; and an external electrode disposed on the body. The cover portion may include barium (Ba), gallium (Ga), and tin (Sn), and a ratio (A/B) of the number of moles (A) of gallium (Ga) to 100 moles of barium (Ba) included in the cover portion to the number of moles (B) of tin (Sn) compared to 100 moles of barium (Ba) included in the cover portion may satisfy 0.2≤A/B≤4.0.

16 Claims, 7 Drawing Sheets

I-I'

(51) Int. Cl.

| | |
|---|---|
| ***H01G 4/012*** | (2006.01) |
| ***H01G 4/12*** | (2006.01) |
| ***H01G 4/224*** | (2006.01) |

(56) References Cited

U.S. PATENT DOCUMENTS

| | | | | |
|---|---|---|---|---|
| 2019/0189345 | A1 | 6/2019 | Moon et al. | |
| 2019/0241476 | A1 | 8/2019 | Nomura et al. | |
| 2019/0279817 | A1* | 9/2019 | Park | H01G 4/1263 |
| 2022/0177371 | A1* | 6/2022 | Chung | H01G 4/248 |
| 2022/0199326 | A1 | 6/2022 | Kim et al. | |
| 2024/0194407 | A1* | 6/2024 | Chung | C04B 35/4682 |
| 2025/0157733 | A1* | 5/2025 | Shim | H01G 4/1209 |

FOREIGN PATENT DOCUMENTS

| | | | |
|---|---|---|---|
| KR | 10-2019-0071713 | A | 6/2019 |
| KR | 10-2019-0074019 | A | 6/2019 |
| KR | 10-2022-0088099 | A | 6/2022 |

* cited by examiner

MULTILAYER ELECTRONIC COMPONENT

CROSS-REFERENCE TO RELATED APPLICATION(S)

This application claims benefit of priority to Korean Patent Application No. 10-2023-0158979 filed on Nov. 16, 2023, in the Korean Intellectual Property Office, the disclosure of which is incorporated herein by reference in its entirety.

TECHNICAL FIELD

The present disclosure relates to a multilayer electronic component.

A multilayer ceramic capacitor (MLCC), a multilayer electronic component, is a chip-type condenser mounted on the printed circuit boards of various types of electronic product, such as image display devices including a liquid crystal display (LCD) and a plasma display panel (PDP), computers, smartphones and mobile phones, and serves to charge or discharge electricity therein or therefrom.

The multilayer ceramic capacitor may be used as a component in various electronic devices due to having a small size, ensuring high capacitance and being easily mounted. With the miniaturization and high output power of various electronic devices such as computers and mobile devices, demand for miniaturization and high capacitance of multilayer ceramic capacitors has also been increasing.

With the miniaturization and the high capacitance of the multilayer ceramic capacitor, in order to realize high electrical properties, research has been conducted to reduce the size of dielectric grains, which are microstructures, to alleviate an electric field concentration phenomenon. As the size of the dielectric grains was reduced, the electric field concentration phenomenon was improved, but as pores within the microstructure were excessively generated, the problem of deteriorating moisture resistance reliability occurred, and research has been conducted to address both electrical characteristics and moisture resistance reliability.

SUMMARY

An aspect of the present disclosure is to provide a multilayer electronic component having improved moisture resistance and reliability.

An aspect of the present disclosure is to provide a multilayer electronic component having improved electrical characteristics.

An aspect of the present disclosure is to provide a multilayer electronic component having improved reliability.

However, the aspects of the present disclosure are not limited to the above-described contents, and may be more easily understood in the process of describing specific example embodiments of the present disclosure.

A multilayer electronic component according to an example embodiment of the present disclosure may include: a body including a capacitance formation portion including a dielectric layer and internal electrodes alternately disposed with the dielectric layer in a first direction, and a cover portion disposed on both end surfaces of the capacitance formation portion in the first direction; and an external electrode disposed on the body. The cover portion may include barium (Ba), gallium (Ga), and tin (Sn), and a ratio (A/B) of the number of moles (A) of gallium (Ga) to 100 moles of barium (Ba) included in the cover portion to the number of moles (B) of tin (Sn) compared to 100 moles of barium (Ba) included in the cover portion may satisfy $0.2 \le A/B \le 4.0$.

A multilayer electronic component according to another example embodiment of the present disclosure may include: a body including a capacitance formation portion including a dielectric layer and internal electrodes alternately disposed with the dielectric layer in a first direction, and a cover portion disposed on both end surfaces of the capacitance formation portion in the first direction; and an external electrode disposed on the body. The cover portion may include titanium (Ti), gallium (Ga), and tin (Sn), and the number of moles (A) of gallium (Ga) compared to 100 moles of titanium (Ti) included in the cover portion is 0.3 moles or more and 6.0 moles or less.

One of the various effects of the present disclosure is to improve moisture resistance reliability of a multilayer electronic component.

One of the various effects of the present disclosure is to improve electrical characteristics of a multilayer electronic component.

One of the various effects of the present disclosure is to improve reliability of a multilayer electronic component.

However, advantages and effects of the present application are not limited to the foregoing content and may be more easily understood in the process of describing a specific example embodiment of the present disclosure.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
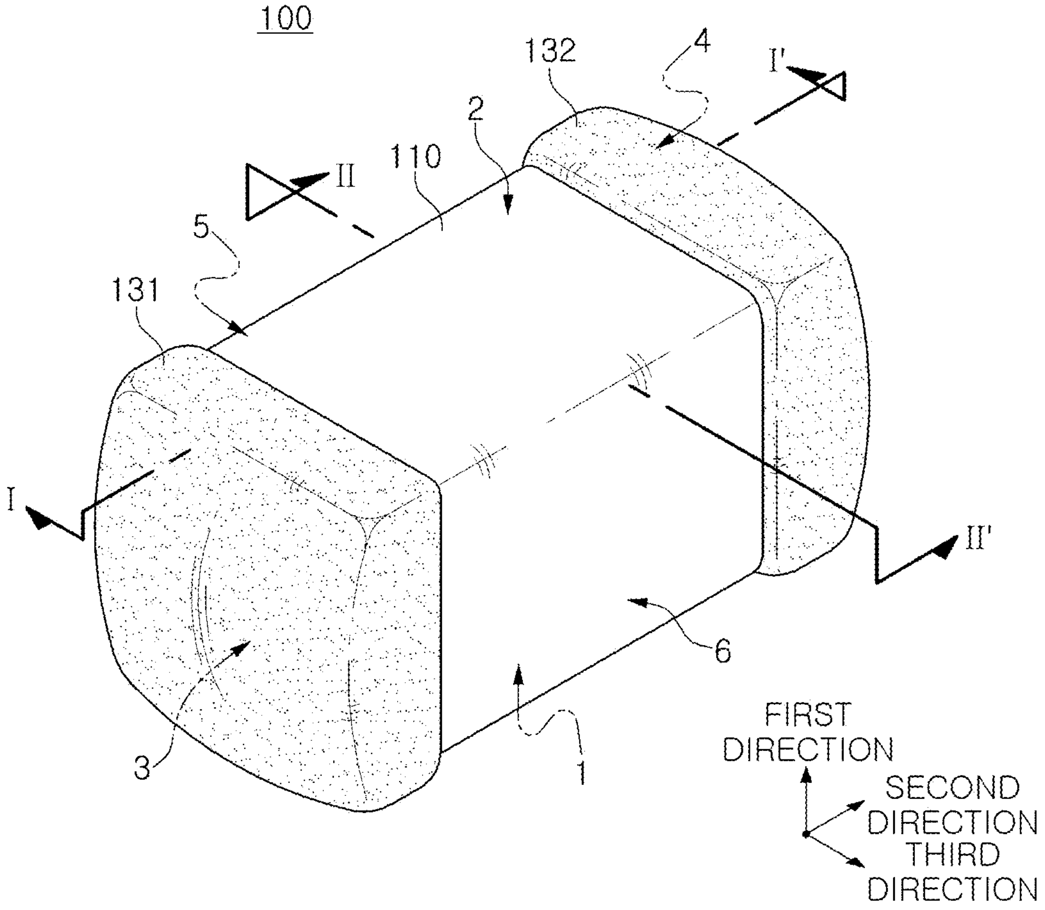
FIG. 1 is a perspective view schematically illustrating a multilayer electronic component according to an example embodiment of the present disclosure.

Hereinafter, example embodiments of the present disclosure will be described with reference to specific example embodiments and the attached drawings. The example embodiments of the present disclosure may, however, be exemplified in many different forms and should not be construed as being limited to the specific embodiments set forth herein. The example embodiments disclosed herein are provided for those skilled in the art to better explain the present disclosure. Therefore, in the drawings, the shapes and dimensions of elements may be exaggerated for clarity, and the same reference numerals will be used throughout to designate the same or like elements.

In addition, in order to clearly describe the present disclosure in the drawings, the contents unrelated to the description are omitted, and since sizes and thicknesses of each component illustrated in the drawings are arbitrarily illustrated for convenience of description, the present disclosure is not limited thereto. In addition, components with the same function within the same range of ideas are described using the same reference numerals. Throughout the specification, when a certain portion "includes" or "comprises" a certain component, this indicates that other components are not excluded and may be further included unless otherwise noted.

In the drawings, a first direction may be defined as a thickness T direction, a second direction may be defined as a length L direction, and a third direction may be defined as a width W direction.

Multilayer Electronic Component

FIG. 1 is a perspective view schematically illustrating a multilayer electronic component according to an example embodiment of the present disclosure.

Figure 2:
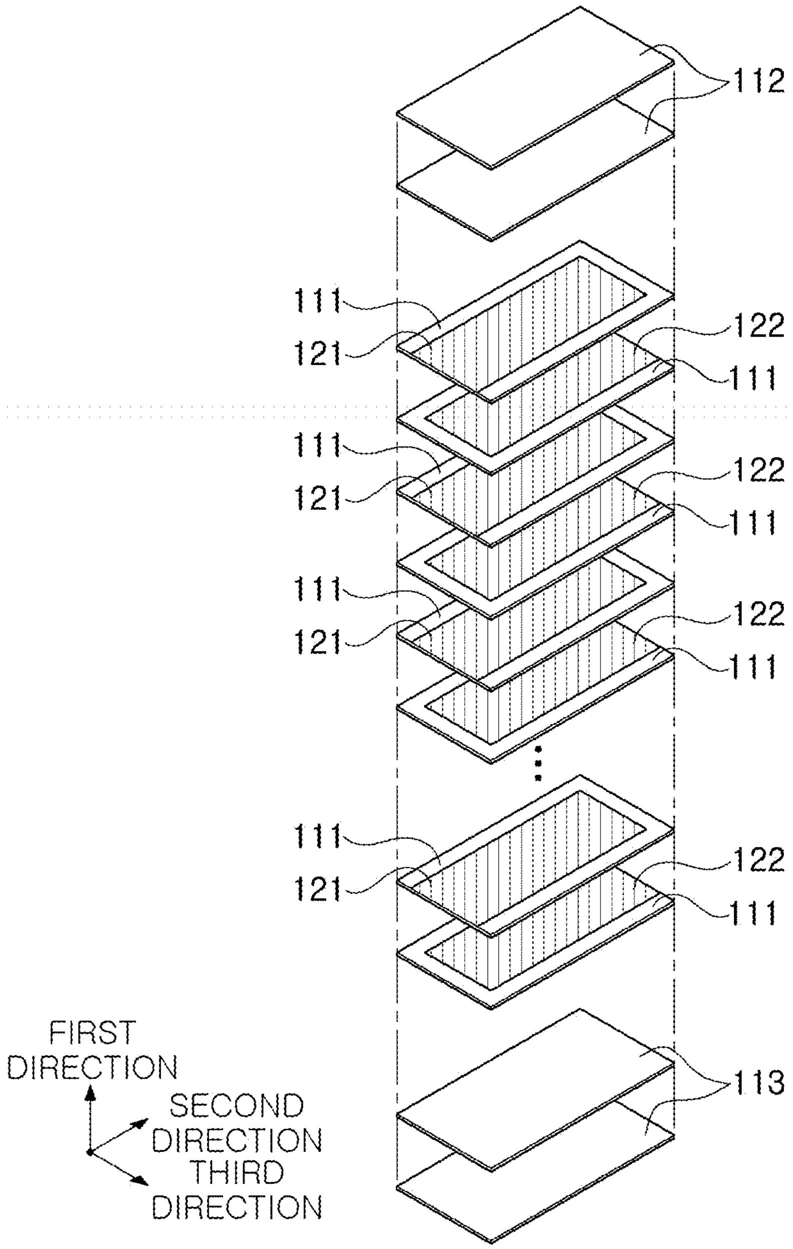
FIG. 2 schematically illustrates an exploded perspective view illustrating a stack structure of internal electrodes.

FIG. 2 schematically illustrates an exploded perspective view illustrating a stack structure of internal electrodes.

Figure 3:
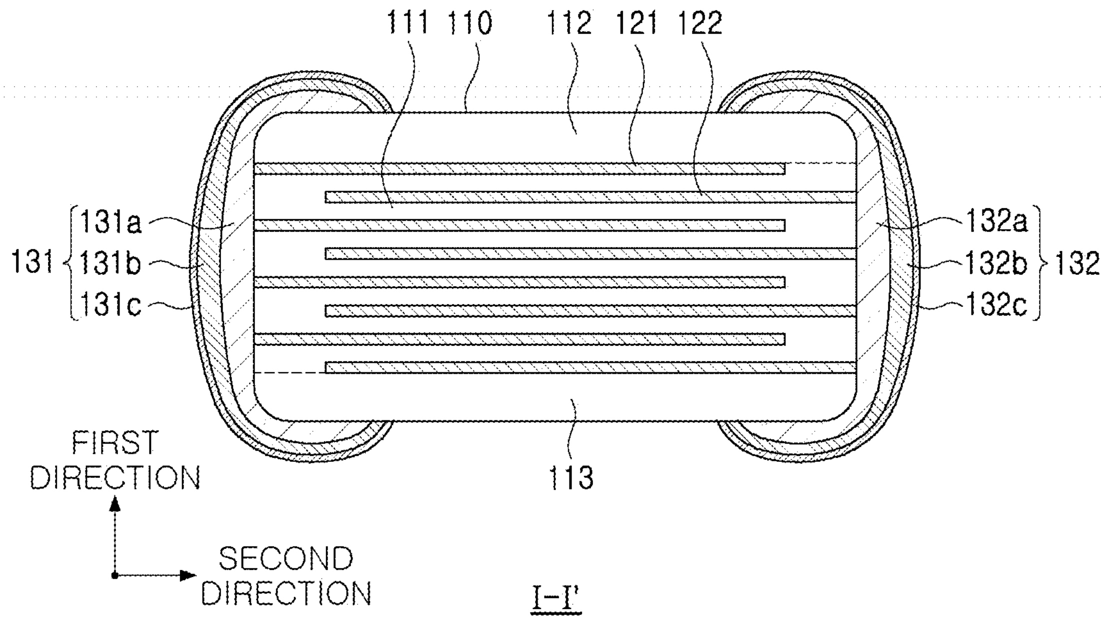
FIG. 3 is a schematic cross-sectional view taken along line I-I' of FIG. 1.

FIG. 3 is a schematic cross-sectional view taken along line I-I' of FIG. 1.

Figure 4:
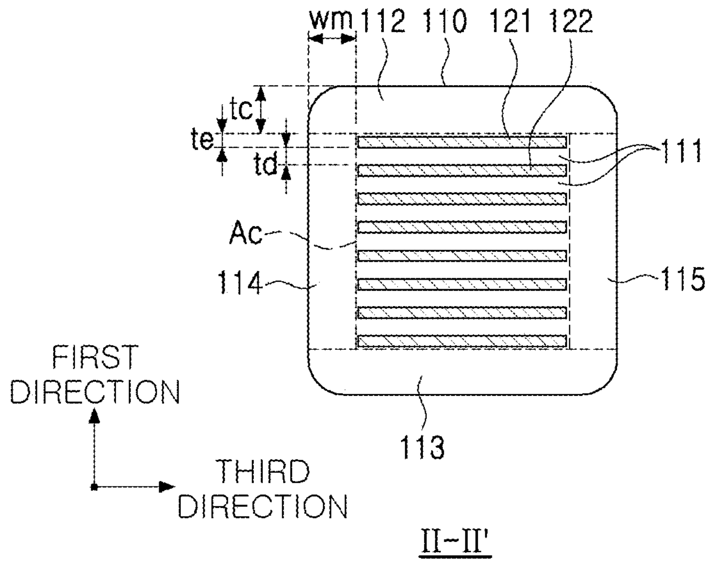
FIG. 4 is a schematic cross-sectional view taken along line II-II' of FIG. 1.

FIG. 4 is a schematic cross-sectional view taken along line II-II' of FIG. 1.

Hereinafter, a multilayer electronic component according to an example embodiment of the present disclosure will be described in detail with reference to FIGS. 1 to 4. However, as an example of a multilayer electronic component, a multilayer ceramic capacitor will be described, but the multilayer electronic component of the present disclosure may also be applied to various electronic products using dielectric compositions, such as inductors, piezoelectric elements, varistors, or thermistors.

A multilayer electronic component 100 according to an example embodiment of the present disclosure may include a body 110 including a capacitance formation portion Ac including a dielectric layer 111 and internal electrodes 121 and 122 alternately disposed with the dielectric layer 111 in a first direction, and cover portions 112 and 113 disposed on both end surfaces of the capacitance formation portion Ac in the first direction; and external electrodes 131 and 132 disposed on the body 110. The cover portions 112 and 113 may include barium (Ba), gallium (Ga), and tin (Sn), and a ratio (A/B) of the number of moles (A) of gallium (Ga) to 100 moles of barium (Ba) included in the cover portions 112 and 113 to the number of moles (B) of tin (Sn) compared to 100 moles of barium (Ba) included in the cover portions 112 and 113 may satisfy $0.2 \le A/B \le 4.0$.

The body 110 may include dielectric layers 111 and internal electrodes 121 and 122 alternately stacked.

More specifically, the body 110 may include a capacitance formation portion Ac disposed inside the body 110, and including first internal electrodes 121 and second internal electrodes 122 alternately arranged to face each other with the dielectric layer 111 interposed therebetween to form capacitance.

There is no particular limitation on the specific shape of the body 110, but as illustrated, the body 110 may have a hexahedral shape or a shape similar thereto. Due to contraction of ceramic powder particles included in the body 110 during a sintering process, the body 110 may not have a hexahedral shape with entirely straight lines, but may have a substantially hexahedral shape.

The body 110 may have first and second surfaces 1 and 2 opposing each other in the first direction, third and fourth surfaces 3 and 4 connected to the first and second surfaces 1 and 2 and opposing each other in the second direction, and fifth and sixth surfaces 5 and 6 connected to the first to fourth surfaces 1, 2, 3 and 4 and opposing each other in the third direction.

In a state in which a plurality of dielectric layers 111 included in the body 110 are sintered, boundaries between adjacent dielectric layers 111 may be integrated so as to be difficult to identify without using a scanning electron microscope (SEM).

The materials included in the dielectric layer 111 is not limited as long as sufficient electrostatic capacity may be obtained therewith. In general, a perovskite ($ABO_3$)-based material may be used, and, for example, a barium titanate-based material, a lead composite perovskite-based material, or a strontium titanate-based material may be used. The barium titanate-based material may include $BaTiO_3$-based ceramic particles, and examples of ceramic particles may include $BaTiO_3$, and $(Ba_{1-x}Ca_x)TiO_3$ $(0<x<1)$, $Ba(Ti_{1-y}Ca_y)O_3$ $(0<y<1)$, $(Ba_{1-x}Ca_x)(Ti_{1-y}Zr_y)O_3$ $(0<x<1, 0<y<1)$ or $Ba(Ti_{1-y}Zr_y)O_3$ $(0<y<1)$, which is formed by partially employing calcium (Ca) and zirconium (Zr) in $BaTiO_3$.

Additionally, as materials included in the dielectric layer 111, various ceramic additives, organic solvents, binders, dispersants, and the like, may be added to particles such as barium titanate ($BaTiO_3$) according to the purpose of the present disclosure.

Additionally, the dielectric layer 111 may be formed using a dielectric material such as barium titanate ($BaTiO_3$), and thus may include a dielectric microstructure after sintering. The dielectric microstructure may include a plurality of grains, grain boundaries disposed between the adjacent grains, and a triple point disposed at a point at which three or more grain boundaries are in contact with each other, each of which may be included in plural.

In the present disclosure, in order to identify the dielectric layer included in the cover portions 112 and 113, which is described below, the dielectric layer 111 included in the capacitance formation portion Ac may be defined as a first dielectric layer 111, and the dielectric layer included in the cover portions 112 and 113 may be defined as a second dielectric layer.

In the present disclosure, as an example of a more specific method of measuring the content of elements included in each component of the multilayer electronic component 100, in the case of destruction method, components may be analyzed using an Energy Dispersive X-ray Spectroscopy (EDS) mode of the scanning electron microscopy (SEM), an EDS mode of a transmission electron microscope (TEM), or an EDS mode of a scanning transmission electron microscope (STEM). First, a thinly sliced analysis sample is prepared using a focused ion beam (FIB) device in a region including dielectric microstructures, in cross-sections of a sintered body or a sintered side marge portion. Then, a damaged layer on a surface of the thinly sliced analysis sample is removed using xenon (Xe) or argon (Ar) ion milling, and then, qualitative/quantitative analysis is performed by mapping each component to be measured in an image obtained using SEM-EDS, TEM-EDS, or STEM-EDS. In this case, the qualitative/quantitative analysis graph of each component may be expressed in terms of mass percentage (wt %), atomic percentage (at %), or mole percentage (mol %) of each element. In this case, the qualitative/quantitative analysis graph thereof may be expressed by converting the number of moles of another specific component to the number of moles of a specific component.

Through another method, a chip may be crushed and a region including the dielectric microstructures may be selected, and in a region including the selected dielectric microstructures, the components of the region including the dielectric microstructures may be analyzed using devices such as inductively coupled plasma spectroscopy (ICP-OES) and inductively coupled plasma mass spectrometry (ICP-MS).

In an example embodiment of the present disclosure, the dielectric layer 111 of the capacitance formation portion Ac may not include gallium (Ga).

Here, the fact that the dielectric layer 111 of the capacitance formation portion Ac does not include gallium (Ga) may denote that a dielectric slurry or dielectric green sheet state does not include gallium (Ga) before sintering the dielectric layer 111, or may denote that the dielectric layer 111 disposed in a center region of the capacitance formation portion Ac does not include gallium (Ga).

That is, as the gallium (Ga) included in the cover portions 112 and 113 to be described below undergoes a sintering process such as high temperature heat treatment, gallium (Ga) may diffuse into a region of the dielectric layer 111 of the capacitance formation portion Ac adjacent to the cover portions 112 and 113 of the capacitance formation portion Ac, which may denote that the dielectric layer 111 disposed in the center portion of the capacitance formation portion Ac does not include gallium (Ga).

For example, based on the first and second directional cross-sections from a third directional center of the body 110, when a 10 μm×10 μm region disposed in the first and second directional center portions is observed in an Energy Dispersive X-ray Spectrometer (EDS) mode of a scanning electron microscope (SEM), this may denote that gallium (Ga) is not detected, or that gallium (Ga) is detected in an amount of less than 0.1 at %.

A thickness td of the dielectric layer 111 is not limited.

However, in order to achieve high capacitance of the multilayer electronic component, the thickness of the dielectric layer 111 may be 3.0 μm or less, and in order to more easily achieve miniaturization and high capacitance, the thickness of the dielectric layer 111 may be 1.0 μm or less, preferably 0.6 μm or less, and more preferably 0.4 μm or less.

Here, the thickness td of the dielectric layer 111 may refer to a thickness td of the dielectric layer 111 disposed between the first and second internal electrodes 121 and 122.

Meanwhile, the thickness td of the dielectric layer 111 may refer to a first directional size of the dielectric layer 111. Additionally, the thickness td of the dielectric layer 111 may refer to an average thickness td of the dielectric layer 111, and may refer to an average size of the dielectric layer 111 in the first direction.

The average size of the dielectric layer 111 in the first direction may be measured by scanning first and second directional cross-sections of the body 110 with a scanning electron microscope (SEM) of 10,000× magnification. More specifically, the average size of one dielectric layer 111 in the first direction may be an average value calculated by measuring the first directional size of one dielectric layer 111 at 30 points spaced apart from each other at equal intervals in the second direction in the scanned image. The 30 points spaced apart from each other at equal intervals may be designated in the capacitance formation portion Ac. Additionally, when the average value is measured by extending an average value measurement up to 10 dielectric layers 111, an average thickness of the dielectric layers 111 in the first directional may be further generalized.

The internal electrodes 121 and 122 may be alternately stacked with the dielectric layer 111.

The internal electrodes 121 and 122 may include a first internal electrode 121 and a second internal electrode 122, and the first and second internal electrodes 121 and 122 may be alternately arranged to face each other with the dielectric layer 111 included in the body 110 interposed therebetween, and may be exposed to the third and fourth surfaces 3 and 4 of the body 110, respectively.

More specifically, the first internal electrode 121 may be spaced apart from the fourth surface 4 and may be exposed through the third surface 3, and the second internal electrode 122 may be spaced apart from the third surface 3 and may be exposed through the fourth surface 4. A first external electrode 131 may be disposed on the third surface 3 of the body 110 and may be connected to the first internal electrode 121, and a second external electrode 132 may be disposed on the fourth surface 4 of the body 110 and may be connected to the second internal electrode 122.

That is, the first internal electrode 121 may be connected to the first external electrode 131 without being connected to the second external electrode 132, and the second internal electrode 122 may be connected to the second external electrode 132 without being connected to the first external electrode 131. In this case, the first and second internal electrodes 121 and 122 may be electrically separated from each other by the dielectric layer 111 disposed therebetween.

Meanwhile, the body 110 may be formed by alternately stacking ceramic green sheets on which the first internal electrode 121 is printed and ceramic green sheets on which the second internal electrode 122 are printed, and then sintering the ceramic green sheets.

The material included in the internal electrodes 121 and 122 is not particularly limited, and any material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), and alloys thereof.

Additionally, the internal electrodes 121 and 122 may be formed by printing a conductive paste for internal electrodes including one or more of nickel (Ni), copper (Cu), palladium (Pd), silver (Ag), gold (Au), platinum (Pt), tin (Sn), tungsten (W), titanium (Ti) and alloys thereof on a ceramic green sheet. A printing method for the conductive paste for internal electrodes may be a screen-printing method or a gravure printing method, but the present disclosure is not limited thereto.

Meanwhile, a thickness the of the internal electrodes 121 and 122 is not limited.

However, in order to achieve high capacitance of the multilayer electronic component, the thickness of the internal electrodes 121 and 122 may be 1.0 μm or less, and in order to more easily achieve the miniaturization and the high capacitance, the thickness of the internal electrodes 121 and 122 may be 0.6 μm or less, and more preferably 0.4 μm or less.

Here, the thickness the of the internal electrodes 121 and 122 may refer to a first directional size of the internal electrodes 121 and 122. Additionally, the thickness the of the internal electrodes 121 and 122 may refer to an average thickness the of the internal electrodes 121 and 122, and may refer to an average size of the internal electrodes 121 and 122 in the first direction.

The average size of the internal electrodes 121 and 122 in the first direction may be measured by scanning images of the first and second directional cross-sections of the body 110 with a scanning electron microscope (SEM) of 10,000× magnification. More specifically, the average size of one internal electrode in the first direction may be an average value calculated by measuring the first directional size of one internal electrode at 30 points spaced apart from each other at equal intervals in the second direction in the scanned image. The 30 points spaced apart from each other at equal intervals may be designated in the capacitance formation portion Ac. Additionally, when the average value is measured by extending an average value measurement up to 10 internal electrodes 121 and 122, an average thickness of the internal electrodes 121 and 122 in the first directional may be further generalized.

Meanwhile, in an example embodiment of the present disclosure, the average thickness td of at least one of the plurality of dielectric layers 111 and the average thickness the of at least one of the plurality of internal electrodes 121 and 122 may satisfy 2×te<td.

In other words, the average thickness td of one dielectric layer 111 may be larger than twice the average thickness the of one internal electrode 121 or 122. Preferably, the average thickness td of the plurality of dielectric layers 111 may be larger than twice the average thickness the of the plurality of internal electrodes 121 and 122.

In general, high-voltage electronic components have a major issue due to reliability issues due to a decrease in breakdown voltage (BDV) in a high-voltage environment.

Accordingly, in order to prevent a decrease in the breakdown voltage under a high voltage environment, the average thickness td of the dielectric layer 111 may be made larger than twice the average thickness the of the internal electrodes 121 and 122, so that the thickness of the dielectric layer, which is a distance between internal electrodes, may be increased, thereby improving the breakdown voltage (BDV) characteristics.

When the average thickness td of the dielectric layer 111 is less than or equal to twice the average thickness the of the internal electrodes 121 and 122, an average thickness of the dielectric layer, which is a distance between the internal electrodes, may be thin, which may reduce the breakdown voltage, and a short may occur between the internal electrodes.

Meanwhile, the body 110 may include cover portions 112 and 113 disposed on both end-surfaces of the capacitance formation portion Ac in the first direction.

Specifically, the body 110 may include a first cover portion 112 disposed on one surface of the capacitance formation portion Ac in the first direction, and a second cover portion 113 disposed on the other surface of the capacitance formation portion Ac in the first direction, and more specifically, the body 110 may include an upper cover portion 112 disposed above the capacitance formation portion Ac in the first direction, and a lower cover portion 113 disposed below the capacitance formation portion Ac in the first direction.

The upper cover portion 112 and the lower cover portion 113 may be formed by stacking a dielectric layer or two or more dielectric layers on upper and lower surfaces of the capacitance formation portion Ac in the first direction, respectively, and may basically serve to prevent damage to the internal electrodes 121 and 122 due to physical or chemical stress.

The upper cover portion 112 and the lower cover portion 113 do not include the internal electrodes 121 and 122, and may include a base dielectric material the same as a base dielectric material of the first dielectric layer 111. That is, the upper cover portion 112 and the lower cover portion 113 may include a ceramic material, and may include, for example, a barium titanate ($BaTiO_3$)-based ceramic material as the base material.

The second dielectric layer may be formed using a dielectric material such as barium titanate ($BaTiO_3$) and may thus include a dielectric microstructure after sintering. The dielectric microstructure includes a plurality of grains, grain boundaries disposed between the adjacent grains, and a triple point disposed at a point at which three or more grain boundaries are in contact with each other, each of which may be included in plural.

However, a composition of the second dielectric layer may be different from a composition of the first dielectric layer 111, and for example, the second dielectric layer may include gallium (Ga).

That is, the cover portions 112 and 113 may include gallium (Ga).

Since the cover portions 112 and 113 include gallium (Ga), low-temperature sintering may be performed, so that excessive grain growth may be suppressed and grain size distribution may be improved by inducing uniform grain growth. Accordingly, the number of pores (P) may be reduced to improve densification of the cover portions 112 and 113, thereby improving moisture resistance reliability. Additionally, the generation of cracks may be suppressed even when the cover portions 112 and 113 are subjected to external shocks, thereby improving mechanical properties.

Additionally, the cover portions 112 and 113 may include tin (Sn).

Since the cover portions 112 and 113 include tin (Sn), a grain size of the ceramic material may be reduced, and the grain size may be controlled to an appropriate level, thereby alleviating electric field concentration and improving electrical properties.

In the present disclosure, the number of moles of gallium (Ga) and tin (Sn) included in the cover portions 112 and 113 may be an added content based on 100 moles of a main component of a barium titanate ($BaTiO_3$) base material, or the number of moles of gallium (Ga) and tin (Sn) included in the cover portions 112 and 113 may be the number of moles added based on 100 moles of barium (Ba), or the number of moles of gallium (Ga) and tin (Sn) included in the cover portions 112 and 113 may be the number of moles added based on 100 moles of titanium (Ti), but the present disclosure is not particularly limited thereto. For example, when a material other than barium (Ba) is substituted or dissolved in an A-site, which is a barium (Ba) ion site of the main component of the barium titanate ($BaTiO_3$) base material, this may be expressed as 100 moles of A-site or 100 moles of titanium (Ti). Alternatively, when a material other than titanium (Ti) is substituted or dissolved in a B-site, which is a titanium (Ti) ion site of the main component of the barium titanate ($BaTiO_3$) base material, this may be expressed as 100 moles of B-site or 100 moles of barium (Ba). Similarly, when a material other than barium (Ba) is substituted or dissolved in the A-site, which is the barium (Ba) ion site of the main component of the barium titanate ($BaTiO_3$) base material, and a material other than titanium (Ti) is substituted or employed in the B-site, which is the titanium (Ti) ion site, this may be expressed as 100 moles of A-site or 100 moles of B-site.

In an example embodiment of the present disclosure, a ratio (A/B) of the number of moles (A) of gallium (Ga) to 100 moles of the main component of the base material included in the cover portions 112 and 113 to the number of moles (B) of tin (Sn) compared to 100 moles of the main component of the base material included in the cover portions 112 and 113 may satisfy 0.2≤A/B≤4.0.

In other words, the ratio (A/B) of the number of moles (A) of gallium (Ga) to 100 moles of barium (Ba) included in the cover portions 112 and 113 to the number of moles (B) of tin (Sn) compared to 100 moles of barium (Ba) included in the cover portions 112 and 113 may satisfy be 0.2 or more and 4.0 or less.

Additionally, the ratio of the number of moles of gallium (Ga) to 100 moles of titanium (Ti) included in the cover portions 112 and 113 to the number of moles of tin (Sn) compared to 100 moles of titanium (Ti) included in the cover portions 112 and 113 may satisfy 0.2 or more and 4.0 or less.

Hereinafter, the number of moles, contents, ratios, and the like, of other components may be described based on 100 moles of the main component of the base material, but may correspond to the number of moles, content, or ratio of other components based on 100 moles of barium (Ba) or 100 moles of titanium (Ti).

As the ratio (A/B) of the number of moles (A) of gallium (Ga) to 100 moles of the main component of the base material included in the cover portions 112 and 113 to the number of moles (B) of tin (Sn) compared to 100 moles of the main component of the base material included in the cover portions 112 and 113 satisfies 0.2≤A/B≤4.0, in a dielectric slurry state, the main or secondary components of the dielectric base material may not aggregate, and the grain size may be controlled and the grains may grow uniformly, so that the Mean Time To Failure (MTTF) may be improved, and the number of pores (P) may be reduced to improved moisture resistance reliability.

When the ratio (A/B) of the number of moles (A) of gallium (Ga) compared to 100 moles of the main component of the base material included in the cover portions 112 and 113 to the number of moles (B) of tin (Sn) compared to 100 moles of the main component of the base material included in the cover portions 112 and 113 is less than 0.2 (A/B<0.2), due to the lack of gallium (Ga), it may be difficult to confirm the effect of adding gallium (Ga).

When the ratio (A/B) of the number of moles (A) of gallium (Ga) to 100 moles of the main component of the base material included in the cover portions 112 and 113 to the number of moles (B) of tin (Sn) compared to 100 moles of the main component of the base material included in the cover portions 112 and 113 is greater than 4.0 (4.0<A/B), agglomeration may occur within the dielectric slurry, resulting in reduced dispersibility, which may deteriorate reliability such as electrical characteristics or the Mean Time To Failure (MTTF).

In an embodiment of the present disclosure, the number of moles (A) of gallium (Ga) compared to 100 moles of the main component of the base material included in the cover portions 112 and 113 may be 0.3 moles or more and 6.0 moles or less. In other words, 0.3 moles≤A≤6.0 moles may be satisfied.

Alternatively, the number of moles of gallium (Ga) compared to 100 moles of barium (Ba) included in the cover portions 112 and 113 may be 0.3 moles or more and 6.0 moles or less.

Alternatively, the number of moles of gallium (Ga) compared to 100 moles of titanium (Ti) included in the cover portions 112 and 113 may be 0.3 moles or more and 6.0 moles or less.

As the number of moles (A) of gallium (Ga) compared to 100 moles of the base material included in the cover portions 112 and 113 satisfies 0.3 moles≤A≤6.0 moles, the number of pores (P) may be reduced by lowering the sintering temperature of the cover portions 112 and 113, and thus the densification of the cover portions 112 and 113 may be improved, thereby improving moisture resistance reliability. Additionally, the generation of cracks may be suppressed even when the cover portions 112 and 113 are subjected to external shock, and thus the mechanical properties may be improved.

On the other hand, when the number of moles (A) of gallium (Ga) compared to 100 moles of the main component of the base material included in the cover portions 112 and 113 is less than 0.3 moles (A<0.3 moles), there may be a risk that moisture resistance reliability may not be improved because the number of pores (P) is not sufficiently reduced, and when the number of moles (A) of gallium (Ga) compared to 100 moles of the main component of the base material included in the cover portions 112 and 113 is more than 6.0 moles (6.0 moles <A), excessive addition of gallium (Ga) may reduce the dispersibility of the dielectric slurry, resulting in side effects such as a decrease in the breakdown voltage (BDV) or a decrease in mechanical strength.

Meanwhile, the number of moles (B) of tin (Sn) compared to 100 moles of the main component of the base material included in the cover portions 112 and 113 may be 0.1 moles or more and 3.0 moles or less. In other words, 0.1 moles≤B≤3.0 moles may be satisfied.

Alternatively, the number of moles of tin (Sn) compared to 100 moles of barium (Ba) included in the cover portions 112 and 113 may be 0.1 mole or more and 3.0 moles or less.

Alternatively, the number of moles of tin (Sn) compared to 100 moles of titanium (Ti) included in the cover portions 112 and 113 may be 0.1 mole or more and 3.0 moles or less.

As the number of moles (B) of tin (Sn) compared to 100 moles of the main component of the base material included in the cover portions 112 and 113 satisfies 0.1 mole≤B≤3.0 mol, the grain growth of the cover portions 112 and 113 may be controlled, and with grains of an appropriate size, the grain size may be subject to uniform grain growth to improve electrical characteristics such as the breakdown voltage (BDV) and reliability such as the Mean Time To Failure (MTTF).

On the other hand, when the number of moles (B) of tin (Sn) compared to 100 moles of the main component of the base material included in the cover portions 112 and 113 is less than 0.1 moles (B<0.1 moles), it may be difficult to confirm the effect of adding tin (Sn), and when the number of moles (B) of tin (Sn) compared to 100 moles of the main component of the base material included in the cover portions 112 and 113 is more than 3.0 moles (3.0 moles <B), due to excessive addition of tin (Sn), electrical properties may not be realized due to excessive grain growth control.

In an example embodiment of the present disclosure, an average size (AVG) of the plurality of grains included in the cover portions 112 and 113 may be 170 nm or more and 200 nm or less.

A method of measuring the average size (AVG) of a plurality of grains is not particularly limited, but for example, after obtaining an image by capturing a region of 10 μm×10 μm based on the first and third directional cross-section of the first cover portion with a scanning electron microscope (SEM), the size of the grains included in the corresponding region may be measured through a program, and then an average value thereof may be calculated and obtained.

In this case, when a ratio (STD/AVG) of a size standard deviation (STD) of the plurality of crystal grains included in the cover portion to an average size (AVG) of the plurality of grains included in the cover portions 112 and 113 is referred to as a coefficient of variation (CV), a fraction of the coefficient of variation (CV) of the cover portions 112 and 113 may be 50% or more and 60% or less. That is, 50%≤CV≤60% may be satisfied.

As the fraction of the coefficient of variation (CV) of the cover portions 112 and 113 satisfies 50% or more and 60% or less, electrical properties such as the breakdown voltage (BDV) may be improved through uniform grain growth, and reliability of the Mean Time To Failure (MTTF) may be improved.

A lower limit value of the fraction of the coefficient of variation (CV) of the cover portions 112 and 113 is not particularly limited, but it may not be easy to control the coefficient of variation (CV) to less than 50% while inducing grain growth, so that the lower limit value is set to 50%.

Meanwhile, the thickness tc of the cover portions 112 and 113 is not limited.

However, in order to more easily achieve the miniaturization and the high capacitance of the multilayer electronic component, the thickness tc of the cover portions 112 and 113 may be 100 μm or less, preferably 30 μm or less, and more preferably 20 μm or less in ultra-small products.

Here, the thickness tc of the cover portions 112 and 113 may refer to a first directional size of the cover portions 112 and 113 in the first direction. Additionally, the thickness tc of the cover portions 112 and 113 may refer to the average thickness tc of the cover portions 112 and 113, and may refer to an average size of the cover portions 112 and 113 in the first direction.

The average size of the cover portions 112 and 113 in the first direction may be measured by scanning images of the first and second directional cross-sections of the body 110 with a scanning electron microscope (SEM) of 10,000× magnification. More specifically, the average size thereof may refer to an average value calculated by measuring the first directional size at 30 points equally spaced from each other in the second direction in the image obtained by scanning one cover portion.

Additionally, the average size of the cover portion in the first direction measured by the above-described method may have substantially the same size as the average size of the cover portion in the first direction in the first and third directional cross-sections of the body 110.

Meanwhile, the multilayer electronic component 100 may include side margin portions 114 and 115 disposed on both end-surfaces of the capacitance formation portion Ac in the third direction.

More specifically, the side margin portions 114 and 115 may include a first side margin portion 114 disposed on the fifth surface 5 of the body 110 and a second side margin portion 115 disposed on the sixth surface 6 of the body 110.

As illustrated, the side margin portions 114 and 115 may refer to a region between both end-surfaces of the first and second internal electrodes 121 and 122 in the third direction and a boundary surface of the body 110, based on the first and third directional cross-sections of the body 110.

That is, the first side margin portion 114 and the second side margin portion 115 may denote a region that do not include the internal electrodes 121 and 122.

The side margin portions 114 and 115 may basically serve to prevent damage to the internal electrodes 121 and 122 due to physical or chemical stress.

Meanwhile, a width wm of the first and second side margin portions 114 and 115 is not limited.

However, in order to more easily achieve the miniaturization and the high capacitance of the multilayer electronic component 100, the width wm of the side margin portions 114 and 115 may be 100 μm or less, preferably 30 μm or less, and more preferably 20 μm or less in ultra-small products.

Here, the width wm of the side margin portions 114 and 115 may refer to a third directional size of the side margin portions 114 and 115. Additionally, the width wm of the side margin portions 114 and 115 may refer to an average width wm of the side margin portions 114 and 115, and may refer to an average size of the side margin portions 114 and 115 in the third direction.

The average size of the side margin portions 114 and 115 in the third direction may be measured by scanning images of the first and third directional cross-sections of the body 110 with the scanning electron microscope (SEM) of 10,000× magnification. More specifically, the average size thereof may refer to an average value calculated by measuring a third directional size at 10 points equally spaced from each other in the first direction in an image obtained by scanning one side margin portion. In an example embodiment of the present disclosure, a structure in which a ceramic electronic component 100 has two external electrodes 131 and 132 is described, but the number or shape of the external electrodes 131 and 132 may be changed depending on the shape of the internal electrodes 121 and 122 or other purposes.

The external electrodes 131 and 132 may be disposed on the body 110 and may be connected to the internal electrodes 121 and 122.

More specifically, the external electrodes 131 and 132 may be disposed on the third and fourth surfaces 3 and 4 of the body 110, respectively, and may include first and second external electrodes 131 and 132 connected to the first and second internal electrodes 121 and 122, respectively. That is, the first external electrode 131 may be disposed on the third surface 3 of the body and may be connected to the first internal electrode 121, and the second external electrode 132 may be disposed on the fourth surface 4 of the body and may be connected to the second internal electrode 122.

Additionally, the external electrodes 131 and 132 may be disposed to extend to a portion of the first and second surfaces 1 and 2 of the body 110, and may also be disposed to extend to a portion of the fifth and sixth surfaces 5 and 6 of the body 110. That is, the first external electrode 131 may be disposed on a portion of the first, second, fifth, and sixth surfaces 1, 2, 5 and 6 of the body 110 and disposed on the third surface 3 of the body 110, and the second external electrode 132 may disposed on a portion of the first, second, fifth and sixth surfaces 1, 2, 5 and 6 of the body 110 and disposed on the third surface 3 of the body 110.

Meanwhile, the external electrodes 131 and 132 may be formed using any material as long as the material has electrical conductivity, such as a metal, and the specific material may be determined in consideration of electrical properties, structural stability, and the like, and the external electrodes 131 and 132 may further have a multilayer structure.

For example, the external electrodes 131 and 132 may include an electrode layer disposed on the body 110 and a plating layer disposed on the electrode layer.

For a more specific example of the electrode layer, the electrode layer may include first electrode layers 131*a* and 132*a*, sintered electrodes including a first conductive metal and glass, or may include second electrode layers 131*b* and 132*b*, resin-based electrodes including a second conductive metal and resin.

Here, a first conductive metal may refer to a conductive metal included in the first electrode layers 131*a* and 132*a*, and a second conductive metal may refer to a conductive metal included in the second electrode layers 131*b* and 132*b*. In this case, the first conductive metal and the second conductive metal may be identical to or different from each other, and when including a plurality of metal materials, at least one metal material may be the same, but the present disclosure is not particularly limited thereto.

Additionally, the electrode layers 131*a*, 132*a*, 131*b* and 132*b* may be formed by sequentially forming the first electrode layers 131*a* and 132*a* and the second electrode layers 131*b* and 132*b* on the body, and may be formed by transferring a sheet including a conductive metal onto the body, or may be formed by transferring a sheet including the conductive metal onto the sintered electrode.

The material having excellent electrical conductivity may be used as first and second conductive metals included in the electrode layers 131*a*, 132*a*, 131*b* and 132*b*, and for example, the first and second conductive metals may include one or more selected from the group consisting of nickel (Ni), copper (Cu), palladium (Pd), silver (Ag), gold (Au), platinum (Pt), tin (Sn), tungsten (W), titanium (Ti) and alloys thereof, but the present disclosure is not particularly limited thereto.

In an example embodiment of the present disclosure, the electrode layers 131*a*, 132*a*, 131*b* and 132*b* may have a bilayer structure including the first electrode layers 131*a* and 132*a* and the second electrode layers 131*b* and 132*b*, and thus, the external electrodes 131 and 132 may include the first electrode layers 131*a* and 132*a* including a conductive metal and glass, and the second electrode layers 131*b* and 132*b* disposed on the first electrode layers 131*a* and 132*a* and including a conductive metal and a resin.

The first electrode layers 131*a* and 132*a* may serve to improve adhesion to the body 110 by including glass, and the second electrode layers 131*b* and 132*b* may serve to improve bending strength by including the resin.

The conductive metal used in the first electrode layers 131*a* and 132*a* is not particularly limited as long as the conductive metal has a material that may be electrically connected to the internal electrodes 121 and 122 to form electric capacity, and the conductive metal may include, for example, one or more selected from the group consisting of nickel (Ni), copper (Cu), palladium (Pd), silver (Ag), gold (Au), platinum (Pt), tin (Sn), tungsten (W), titanium (Ti) and alloys thereof. The first electrode layers 131*a* and 132*a* may be formed by applying a conductive paste prepared by adding glass frit to the conductive metal particles and then sintering the conductive paste.

The conductive metal included in the second electrode layers 131*b* and 132*b* may serve to electrically connect to the first electrode layers 131*a* and 132*a*.

The conductive metal included in the second electrode layers 131*b* and 132*b* is not particularly limited as long as the conductive metal has a material that may be electrically connected to the electrode layers 131*a* and 132*a*, and the conductive metal may include one or more selected from the group consisting of nickel (Ni), copper (Cu), palladium (Pd), silver (Ag), gold (Au), platinum (Pt), tin (Sn), tungsten (W), titanium (Ti) and alloys thereof.

The conductive metal included in the second electrode layers 131*b* and 132*b* may include one or more of spherical particles and flake-shaped particles. That is, the conductive metal may consist only of flake-shaped particles or only spherical particles, and may be a mixture of flake-shaped particles and spherical particles. Here, the spherical particle may include a shape that is not entirely spherical, for example, a shape in which a length ratio of a major axis and a minor axis (major axis/minor axis) is 1.45 or less. The flake-shaped particles may refer to particles with a flat and elongated shape, and the present disclosure is not particularly limited thereto, but the length ratio of the major axis and the minor axis (major axis/minor axis) may be, for example, 1.95 or more. The lengths of the major and minor axes of the spherical particles and the flake-shaped particles may be measured from images obtained by scanning first and second directional cross-sections cut from the center portion of the multilayer electronic component in the third direction with the scanning electron microscope (SEM).

The resin included in the second electrode layers 131*b* and 132*b* may ensure bonding properties and serve as shock absorbers. The resin included in the second electrode layers 131*b* and 132*b* may have bonding properties and shock absorption properties, and the resin is not particularly limited as long as the resin may be mixed with the conductive metal particles to make a paste, and may include, for example, an epoxy-based resin.

Additionally, the second electrode layers 131*b* and 132*b* may include a plurality of conductive metal particles, an intermetallic compound, and a resin. The intermetallic compound may be included to further improve electrical connectivity with the first electrode layers 131*a* and 132*a*. The intermetallic compound may serve to improve electrical connectivity by connecting a plurality of metal particles, and may serve to surround the plurality of metal particles and connect the metal particles to each other.

In this case, the intermetallic compound may include a metal having a melting point lower than a curing temperature of the resin. That is, because the intermetallic compound includes the metal having the melting point lower than the curing temperature of the resin, the metal having the melting point lower than the curing temperature of the resin is melted during a drying and curing process, and an intermetallic compound with a portion of the metal particles is formed to surround the metal particle. In this case, the intermetallic compound may preferably include a low melting point metal of 300° C. or lower.

For example, the intermetallic compound may include Sn, which has a melting point of 213 to 220° C. Sn is melted during the drying and curing process, and the melted Sn wets high melting point metal particles such as Ag, Ni or Cu through capillary action, and reacts with some of Ag, Ni or Cu metal particles to form intermetallic compounds such as $Ag_3Sn$, $Ni_3Sn_4$, $Cu_6Sn_5$ and $Cu_3Sn$. Ag, Ni or Cu that did not participate in the reaction remain in the form of metal particles.

Accordingly, the plurality of second conductive metal particles may include one or more of Ag, Ni, and Cu, and the intermetallic compound may include one or more of $Ag_3Sn$, $Ni_3Sn_4$, $Cu_6Sn_5$ and $Cu_3Sn$.

The plating layers 131*c* and 132*c* may serve to improve mounting characteristics.

The types of plating layers 131*c* and 132*c* are not particularly limited, and in the drawings, only a single layer of plating layers 131*c* and 132*c* are illustrated, but the present disclosure is not limited thereto, and the plating layers 131*c* and 132*c* may be a single layer of plating layers 131*c* and 132*c* including one or more of nickel (Ni), tin (Sn), palladium (Pd) and alloys thereof, or may be formed of a plurality of layers. For more specific examples of the plating layers 131*c* and 132*c*, the plating layers 131*c* and 132*c* may be Ni plating layers or Sn plating layers, and may be in the form in which a Ni plating layer and a Sn plating layer are sequentially formed on the electrode layer, and may be in the form in which the Sn plating layer, the Ni plating layer, and the Sn plating layer are formed sequentially. Additionally, the plating layers 131*c* and 132*c* may include a plurality of Ni plating layers and/or a plurality of Sn plating layers.

There is no need to specifically limit the size of the multilayer electronic component 100.

However, in order to achieve both miniaturization and high capacitance, the thickness of the dielectric layer and internal electrodes must be thinned to increase the number of stacked layers, and thus, the effect according to the present disclosure may be more noticeable in the multilayer electronic component 100 having a size of 1005 (length×width: 1.0 mm×0.5 mm) or less.

Hereinafter, the present disclosure will be described in more detail through examples but this is intended to help the specific understanding of the invention, and the scope of the present invention is not limited by an example embodiment.

Example Embodiment

Hereinafter, according to the ratio (A/B) of the number of moles (A) of gallium (Ga) to 100 moles of the main component of the base material included in the cover portion to the number of moles (B) of tin (Sn) compared to 100 moles of the main component of the base material included in the cover portion, dielectric slurry agglomeration, an average grain size (AVG), a coefficient of variation (CV) of a grain size, a porosity (%), a breakdown voltage (BDV), a Mean Time To Failure (MTTF), and moisture resistance reliability were evaluated and are shown in [Table 1].

Regarding whether the dielectric slurry agglomerates, when aggregates including gallium (Ga) were detected in a dielectric slurry state, this was evaluated as 'O,' and when no aggregates including gallium (Ga) were detected, this was evaluated as 'X.'

Regarding the average grain size and the coefficient of variation (CV), after measuring the size of grains included in a region of 23 μm×23 μm in the first and third directional cross-sections of the first cover portion, an average value and a standard deviation value thereof were calculated and then, the average size and the coefficient of variation of the grains are described.

Regarding the porosity (%), an area fraction (%) of pores (P) is described for the region of 23 μm×23 μm in the first and third directional cross-section of the first cover portion.

Regarding the breakdown voltage (BDV), when the voltage (V) value was increased for 50 sample chips for each test example, an average value of voltage (V) values at which a short occurs were calculated and described.

Regarding the Mean Time To Failure (MTTF), when a voltage of 9.45 V was applied to 40 sample chips per each test example at 125° C., the Mean Time To Failure (MTTF) was calculated and described using values of the time at which a short occurred.

Regarding the moisture resistance reliability evaluation, when a voltage of 9.45 V was applied to 40 sample chips per each test example for 24 hours under a temperature condition of 85° C. and a relative humidity condition of 85%, the number of sample chips in which a short occurred, among all sample chips, was expressed as a fraction (defect rate).

TABLE 1

| Sample number | A/B | Slurry agglomeration | Grain average size (nm) | CV (%) | Porosity (%) | BDV (V) | MTTF (hrs) | Moisture Resistance Reliability (%) |
|---|---|---|---|---|---|---|---|---|
| Test Example 1 | 0.0 | X | 166 | 49.0 | 0.415 | 55 | 13 | 23 |
| Test Example 2 | 0.2 | X | 174 | 50.2 | 0.167 | 55 | 17 | 6 |
| Test Example 3 | 0.4 | X | 182 | 53.4 | 0.172 | 58 | 16 | 3 |
| Test Example 4 | 0.6 | X | 188 | 57.1 | 0.117 | 55 | 19 | 0 |
| Test Example 5 | 1.5 | X | 194 | 59.8 | 0.108 | 52 | 21 | 0 |
| Test Example 6 | 4.0 | X | 199 | 59.2 | 0.097 | 53 | 20 | 2 |
| Test Example 7 | 4.67 | ○ | 208 | 58.1 | 0.082 | 41 | 16 | 3 |
| Test Example 8 | 6.0 | ○ | 203 | 55.6 | 0.087 | 42 | 15 | 3 |

In Test Example 1, tin (Sn) was added in an amount of 3.0 moles or less, but gallium (Ga) was not added. Accordingly, the average grain size is relatively small at 166 nm, and the Mean Time To Failure (MTTF) is also 13 hours, which is evaluated to be poor in reliability. Additionally, the porosity is high at 0.415%, and similarly, the moisture resistance reliability defect rate is evaluated to be poor at 23%. This is because gallium (Ga) is not added, from which the reliability is predicted to be poor as sufficient grain growth does not occur, and the moisture resistance reliability is predicted to be poor due to the generation of a large number of pores. In Test Examples 2 to 6, the ratio (A/B) of the number of moles (A) of gallium (Ga) compared to 100 moles of the main component of the base material included in the cover portion to the number of moles (B) of tin (Sn) compared to 100 moles of the main component of the base material included in the cover portion corresponds to 0.2 to 4.0. Due to appropriate grain growth, the breakdown voltage (BDV) is excellent at over 50 V, and the Mean Time To Failure (MTTF) is also higher than that of Test Example 1. The porosity was also measured to be 0.2% or less, and accordingly, the moisture resistance reliability defect rate was improved compared to Test Example 1. This is because tin (Sn) and gallium (Ga) are added in appropriate amounts, from the reliability is improved due to sufficient grain growth, and pore generation is suppressed, thereby evaluating the moisture resistance reliability to be good.

In Test Example 7 and Test Example 8, the ratio (A/B) of the number of moles (A) of gallium (Ga) compared to 100 moles of the main component of the base material included in the cover portion to the number of moles (B) of tin (Sn) compared to 100 moles of the main component of the base material included in the cover portion corresponds to 4.67 and 6.0, respectively. As the content of gallium (Ga) increases compared to the content of tin (Sn), it was confirmed that agglomeration of gallium (Ga) was observed due to poor dispersibility of the dielectric slurry, the breakdown voltage (BDV) also decreased to 41 V and 42 V, respectively, and the Mean Time To Failure (MTTF) gradually decreased to 16 hours and 15 hours, respectively. As gallium (Ga) was added in excess compared to tin (Sn), the porosity was improved and the moisture resistance reliability became excellent, but the electrical properties and reliability is evaluated to be poor due to excessive grain growth.

In this manner, when gallium (Ga) and tin (Sn) are added so that the ratio (A/B) of the number of moles (A) of gallium (Ga) to the number of moles (B) of tin (Sn) is 0.2 to 4.0, it may be seen that electrical characteristics, reliability, and moisture resistance reliability are all improved.

Figure 5A:
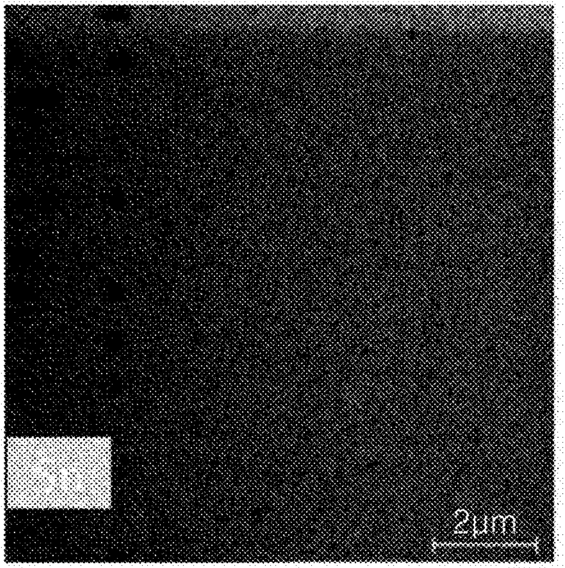
FIG. 5A is an image obtained by mapping a tin (Sn) element in an EDS analysis mode of a transmission electron microscope (TEM) on a cross-section of a cover portion.
Figure 5B:
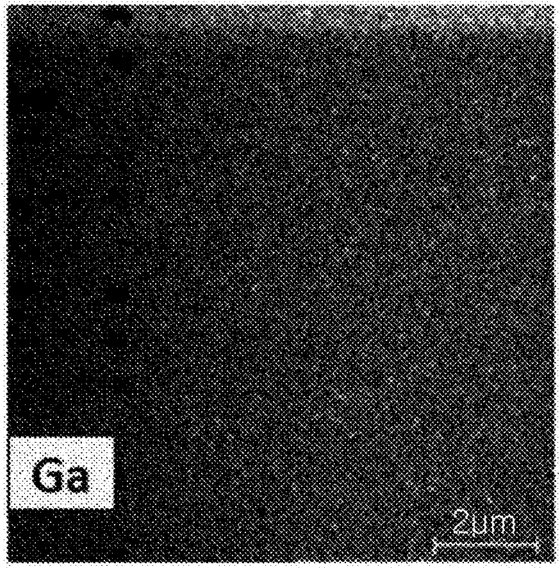
FIG. 5B is an image obtained by mapping a gallium (Ga) element in the EDS analysis mode of a transmission electron microscope (TEM) on the cross-section of the cover portion.

FIG. 5A is an image obtained by mapping a tin (Sn) element in an EDS analysis mode of a transmission electron microscope (TEM) in a 10 μm×10 μm region of first and third directional cross-sections of a cover portion in Inventive Example, and FIG. 5B is an image obtained by mapping a gallium (Ga) element in the EDS analysis mode of a transmission electron microscope (TEM) on the cross-section of the cover portion in the same region.

In an example embodiment of FIGS. 5A and 5B, the ratio (A/B) of the number of moles (A) of gallium (Ga) to 100 moles of the main component of the base material included in the cover portion to the number of moles (B) of tin (Sn) compared to 100 moles of the main component of the base material included in the cover portion satisfies 0.2≤A/B≤4.0.

In this manner, it may be confirmed that tin (Sn) and gallium (Ga) are detected in the cross-section of the cover portion, and since no aggregated tin (Sn) or gallium (Ga) is observed, the ratio (A/B) of the number of moles (A) of gallium (Ga) to 100 moles of the main component of the base material included in the cover portion to the number of moles (B) of tin (Sn) compared to 100 moles of the main component of the base material included in the cover portion satisfies 0.2≤A/B≤4.0, it may be seen that the dielectric slurry has excellent dispersibility and does not aggregate.

Figure 6A:
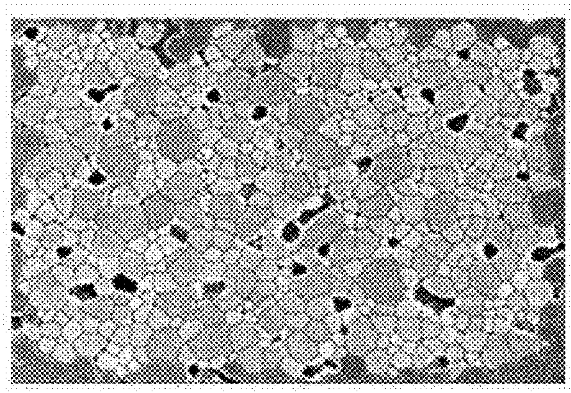
FIG. 6A is an image obtained by observing grains through a program after capturing an image of a cross-section of a cover portion in Comparative Example with a scanning electron microscope (SEM)
Figure 6B:
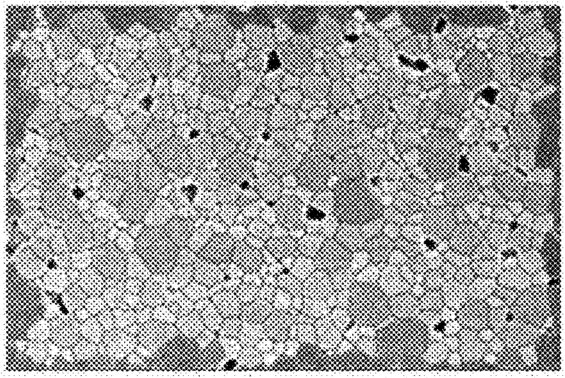
FIG. 6B is an image obtained by observing grains through a program after capturing an image of a cross-section of a cover portion in Inventive Example with the scanning electron microscope (SEM)
Figure 6C:
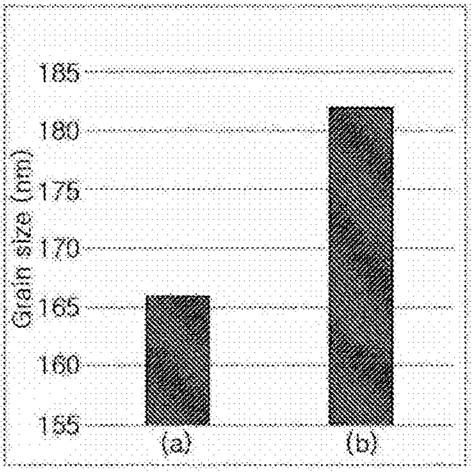
FIG. 6C is a bar graph illustrating an average size of the grains observed in FIGS. 6A and 6B.

FIG. 6A is an image obtained by observing grains through a program after capturing an image of a cross-section of a cover portion in Comparative Example with a scanning electron microscope (SEM), FIG. 6B is an image obtained by observing grains through a program after capturing an image of a cross-section of a cover portion in Inventive Example with the scanning electron microscope (SEM), and FIG. 6C is a bar graph illustrating an average size of the grains observed in FIGS. 6A and 6B.

In Comparative Example of FIG. 6A, only tin (Sn) was added to the cover portion, and the average grain size was measured to be 166 nm.

In Inventive example of FIG. 6B, the test sample was manufactured so that the same amount of tin (Sn) as that added in Comparative Example of FIG. 6A was added to the cover portion and additional gallium (Ga) was simultaneously added thereto, and the ratio (A/B) of the number of moles (A) of gallium (Ga) compared to 100 moles of the main component of the base material included in the cover portion to the number of moles (B) of tin (Sn) compared to 100 moles of the main component of the base material included in the cover portion satisfies 0.2≤A/B≤4.0, and the average grain size was measured to be 188 nm.

As may be seen in FIG. 6C, in the case of Inventive Example of FIG. 6B in which tin (Sn) and gallium (Ga) are added together, the grain size is about 13.2% larger than that of Comparative Example of FIG. 6A in which only tin (Sn) was added, from which it is determined that adding tin (Sn) and gallium (Ga) in appropriate amounts may induce grain growth.

Figure 7A:
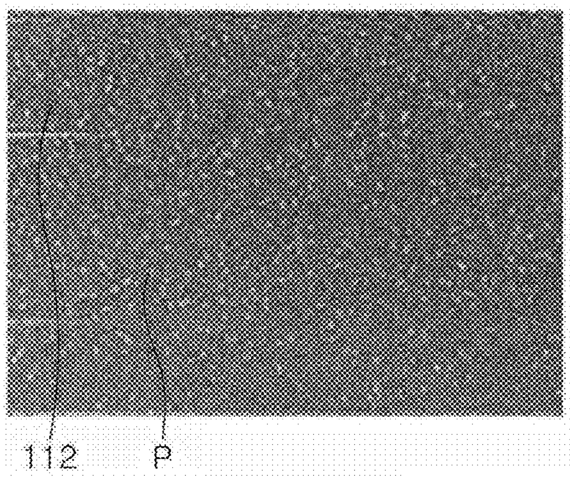
FIG. 7A is an image obtained by observing pores (P) after capturing an image of a cross-section of a cover portion in Comparative Example with a scanning electron microscope (SEM)
Figure 7B:
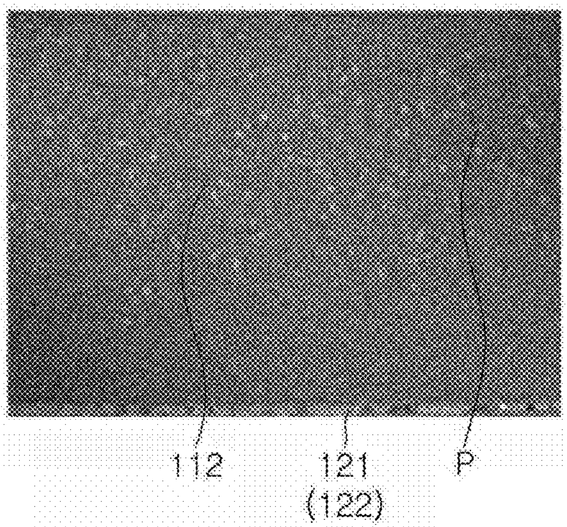
FIG. 7B is an image obtained by observing pores (P) after capturing an image of a cross-section of a cover portion in Inventive Example with the scanning electron microscope (SEM)
Figure 7C:
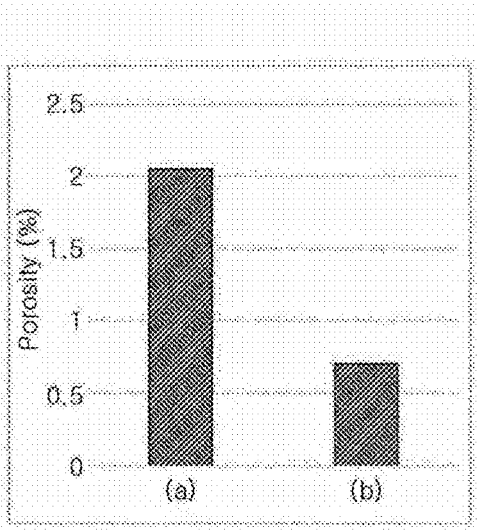
FIG. 7C is a bar graph illustrating the porosity observed in FIGS. 7A and 7B.

FIG. 7A is an image obtained by observing pores (P) after capturing an image of a cross-section of a cover portion in Comparative Example with a scanning electron microscope (SEM), FIG. 7B is an image obtained by observing pores (P) after capturing an image of a cross-section of a cover portion in Inventive Example with the scanning electron microscope (SEM), and FIG. 7C is a bar graph illustrating the porosity observed in FIGS. 7A and 7B.

In Comparative Example of FIG. 7A, only tin (Sn) was added to the cover portion, and the porosity was measured to be 2.1%.

In an embodiment of FIG. 7B, the test sample was manufactured so that the same amount of tin (Sn) added in Comparative Example of FIG. 7A was added to the cover portion and additional gallium (Ga) was simultaneously added thereto, and the ratio (A/B) of the number of moles (A) of gallium (Ga) compared to 100 moles of the main component of the base material included in the cover portion to the number of moles (B) of tin (Sn) compared to 100 moles of the main component of the base material included in the cover portion satisfied 0.2≤A/B≤4.0, and the porosity was measured to be 0.7%.

As may be seen in FIG. 7C, when an appropriate amount of tin (Sn) and gallium (Ga) is added, it may be confirmed that porosity is improved by suppressing the generation of pores.

As may be seen in FIG. 7C, in the case of Inventive Example of FIG. 7B in which tin (Sn) and gallium (Ga) were added together, the porosity was reduced by about 65% compared to Comparative Example of FIG. 7A in which only tin (Sn) was added, from which it is determined that the number of pores may be reduced when tin (Sn) and gallium (Ga) are added in appropriate amounts.

Figure 8A:
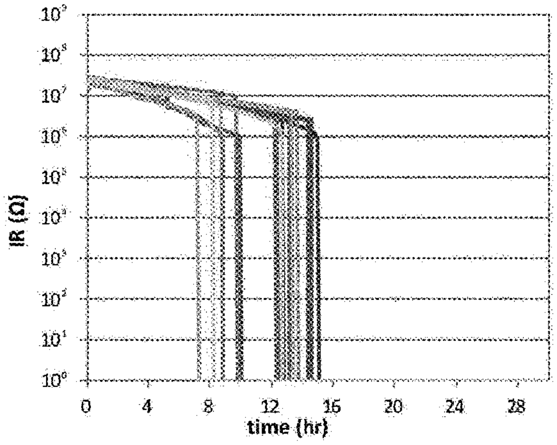
FIG. 8A is an MTTF graph of Comparative Example.
Figure 8B:
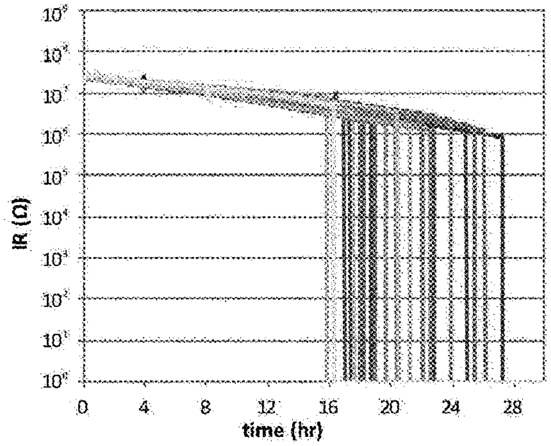
FIG. 8B is an MTTF graph of Inventive Example.

FIG. 8A is an MTTF graph of Comparative Example, and FIG. 8B is an MTTF graph of Inventive Example.

In the Comparative Example in FIG. 8A, a voltage of 9.45 V was applied to 20 sample chips in which only tin (Sn) was added to the cover portion at a temperature of 125° C., and the MTTF was found to be 13 hrs.

In the Inventive Example in FIG. 8B, a voltage of 9.45 V was applied at a temperature of 125° C. to 20 samples in which the same amount of tin (Sn) as added in the Comparative Example of FIG. 8A was added to the cover portion of the Inventive Example and additional gallium (Ga) was simultaneously added thereto, and the ratio (A/B) of the number of moles (A) of gallium (Ga) compared to 100 moles of the main component of the base material included in the cover portion to the number of moles (B) of tin (Sn) compared to 100 moles of the main component of the base material included in the cover portion satisfied 0.2≤A/B≤4.0, and the MTTF was found to be 21 hrs.

Figure 9A:
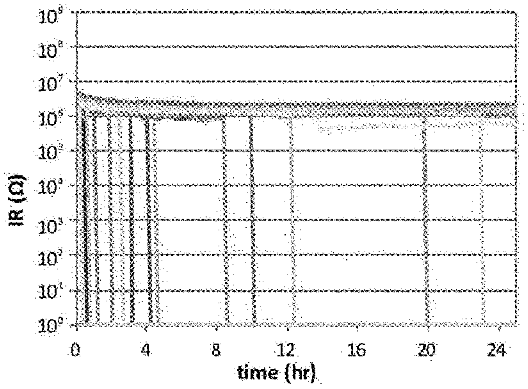
FIG. 9A is a moisture resistance reliability evaluation graph of Comparative Example.
Figure 9B:
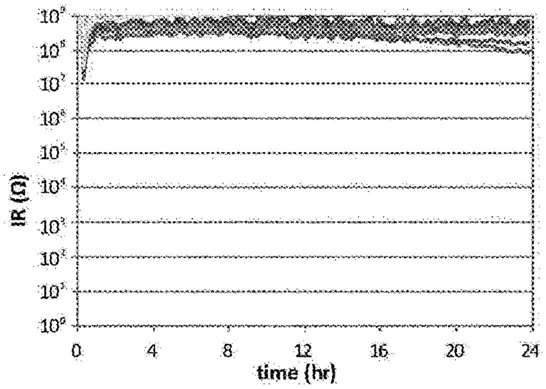
FIG. 9B is a moisture resistance reliability evaluation graph of Inventive Example.

FIG. 9A is a moisture resistance reliability evaluation graph of Comparative Example, and FIG. 9B is a moisture resistance reliability evaluation graph of Inventive Example.

In the Comparative Example in FIG. 9A, a voltage of 9.45 V was applied to 20 sample chips in which only tin (Sn) was added to the cover portion, for 24 hours at a temperature of 85° C. and a relative humidity of 85%, and among the 20 sample chips, the number of samples chips in which a short occurred was 14.

In the Inventive Example of FIG. 9B, a voltage of 9.45 V was applied for 24 hours at a temperature of 85° C. and a relative humidity of 85% to 20 samples in which the same amount of tin (Sn) as added in the Comparative Example of FIG. 9A was added to the cover portion of the Inventive Example and additional gallium (Ga) was simultaneously added thereto, and the ratio (A/B) of the number of moles (A) of gallium (Ga) compared to 100 moles of the main component of the base material included in the cover portion to the number of moles (B) of tin (Sn) compared to 100 moles of the main component of the base material included in the cover portion satisfied 0.2≤A/B≤4.0, and among the 20 sample chips, no shorts occurred.

Although the example embodiment of the present disclosure has been described in detail above, the present disclosure is not limited to the above-described embodiments and the accompanying drawings but is defined by the appended claims. Therefore, those of ordinary skill in the art may make various replacements, modifications, or changes without departing from the scope of the present disclosure defined by the appended claims, and these replacements, modifications, or changes should be construed as being included in the scope of the present disclosure.

In addition, the expression 'an example embodiment' used in the present disclosure does not mean the same embodiment, and is provided to emphasize and explain different unique characteristics. However, the embodiments presented above do not preclude being implemented in combination with the features of another embodiment. For example, although items described in a specific embodiment are not described in another embodiment, the items may be understood as a description related to another embodiment unless a description opposite or contradictory to the items is in another embodiment.

In the present disclosure, the terms are merely used to describe a specific embodiment, and are not intended to limit the present disclosure. Singular forms may include plural forms as well unless the context clearly indicates otherwise.

What is claimed is:

1. A multilayer electronic component, comprising:

a body including a capacitance formation portion including a dielectric layer and internal electrodes alternately disposed with the dielectric layer in a first direction, and a cover portion disposed on both end surfaces of the capacitance formation portion in the first direction; and an external electrode disposed on the body, wherein the cover portion includes barium (Ba), gallium (Ga), and tin (Sn), and a ratio (A/B) of the number of moles (A) of gallium (Ga) to 100 moles of barium (Ba) included in the cover portion to the number of moles (B) of tin (Sn) compared to 100 moles of barium (Ba) included in the cover portion satisfies 0.2≤A/B≤4.0.

2. The multilayer electronic component according to claim 1, wherein the number of moles (A) of gallium (Ga) compared to 100 moles of barium (Ba) included in the cover portion is 0.3 mole or more and 6.0 mole or less.

3. The multilayer electronic component according to claim 1, wherein the number of moles (B) of tin (Sn) compared to 100 moles of barium (Ba) included in the cover portion is 0.1 mole or more and 3.0 mole or less.

4. The multilayer electronic component according to claim 1, wherein the dielectric layer does not include gallium (Ga).

5. The multilayer electronic component according to claim 1, wherein a composition of the dielectric layer included in the capacitance formation portion is different from a composition of a dielectric layer included in the cover portion.

6. The multilayer electronic component according to claim 1, wherein an average size of a plurality of grains included in the cover portion is 170 nm or more and 200 nm or less.

7. The multilayer electronic component according to claim 6, wherein a ratio (STD/AVG) of a size standard deviation (STD) of the plurality of grains included in the cover portion to an average size (AVG) of the plurality of grains included in the cover portion is referred to as a coefficient of variation (CV) of a size, a fraction of the coefficient of variation (CV) of a size is 50% or more and 60% or less.

8. The multilayer electronic component according to claim 1, wherein a content of gallium (Ga) in the cover portion is greater than a content of gallium (Ga) in the dielectric layer.

9. A multilayer electronic component, comprising:

a body including a capacitance formation portion including a dielectric layer and internal electrodes alternately disposed with the dielectric layer in a first direction, and a cover portion disposed on both end surfaces of the capacitance formation portion in the first direction; and an external electrode disposed on the body, wherein the cover portion includes titanium (Ti), gallium (Ga), and tin (Sn), and the number of moles (A) of gallium (Ga) compared to 100 moles of titanium (Ti) included in the cover portion is 0.3 moles or more and 6.0 moles or less.

10. The multilayer electronic component according to claim 9, wherein the number of moles (B) of tin (Sn) compared to 100 moles of titanium (Ti) included in the cover portion is 0.1 mole or more and 3.0 moles or less.

11. The multilayer electronic component according to claim 9, wherein a ratio (A/B) of the number of moles (A) of gallium (Ga) to 100 moles of titanium (Ti) included in the cover portion to the number of moles (B) of tin (Sn) compared to 100 moles of titanium (Ti) included in the cover portion satisfies 0.2≤A/B≤4.0.

12. The multilayer electronic component according to claim 9, wherein the dielectric layer does not include gallium (Ga).

13. The multilayer electronic component according to claim 9, wherein a composition of the dielectric layer included in the capacitance formation portion is different from a composition of a dielectric layer included in the cover portion.

14. The multilayer electronic component according to claim 9, wherein an average size of a plurality of grains included in the cover portion is 170 nm or more and 200 nm or less.

15. The multilayer electronic component according to claim 14, wherein when a ratio (STD/AVG) of a size standard deviation (STD) of the plurality of grains included in the cover portion to an average size (AVG) of the plurality of grains included in the cover portion is referred to as a coefficient of variation (CV) of a size, a fraction of the coefficient of variation (CV) of a size is 50% or more and 60% or less.

16. The multilayer electronic component according to claim 9, wherein a content of gallium (Ga) in the cover portion is greater than a content of gallium (Ga) in the dielectric layer.

* * * * *